Oct. 19, 1971  C. D. MILLER  3,613,212
TAP FOR REMOVING TUBES FROM TUBE SHEETS
Filed July 22, 1969

INVENTOR.
CHARLIE D. MILLER.
BY D. Emmett Thompson
ATTORNEY

3,613,212
TAP FOR REMOVING TUBES FROM TUBE SHEETS
Charlie D. Miller, Syracuse, N.Y., assignor to
Carrier Corporation, Syracuse, N.Y.
Filed July 22, 1969, Ser. No. 843,361
Int. Cl. B25b 27/06
U.S. Cl. 29—202                                                5 Claims

ABSTRACT OF THE DISCLOSURE

The tube pulling tap is formed with a thread, the force applying side of the helixes of the thread confronting the shank of the tap inclining from the crest of the threads toward the roots thereof in a direction from the shank. Accordingly, the tube is not cammed outwardly into tighter engagement with the tube sheet but conversely is contracted inwardly resulting in axial withdrawal of the tube from the sheet with less applied force.

BACKGROUND OF THE INVENTION

Heat exchangers consist of a shell to the ends of which are fixedly secured tube sheets formed with tube receiving holes. Tubes are inserted in the holes of the sheets and the ends of the tubes are expanded in leak tight engagement with the sheets.

On occasion, it is necessary to replace the tubes requiring the defective tubes to be removed from the heat exchanger. Various methods are employed to remove the old tubes. One such method is to cut one end of the tube free from one tube sheet. A tap is then threaded into the opposite end of the tube and a pulling force is applied to the tap sufficient to pull the tube from the tube sheet. With taps of conventional form such as those provided with V-threads or acme threads, the side of the threads diverging from the crest result, when axial force is applied to the tap, to cam the tube outwardly into tighter engagement with the tube sheet. This results in the necessity of applying great pulling force to the tap in order to separate the expanded end of the tube from the tube sheet and frequently the tap is torn from the tube, this resulting from the fact that in most instances heat exchangers are equipped with copper tubes.

SUMMARY OF THE INVENTION

This invention is directed to the formation of the tap thread and has as an object a tube extracting tap which when threaded into the end of the tube will not expand the same, but functions to contract the end of the tube, reducing the frictional engagement between the tube and the tube sheet and upon outward axial movement of the tap, the end of the tube is contracted to a greater extent, whereby the axial force required to remove the tube is greatly reduced.

DESCRIPTION OF THE PREFERRED EMBODIMENT

Figure 1:
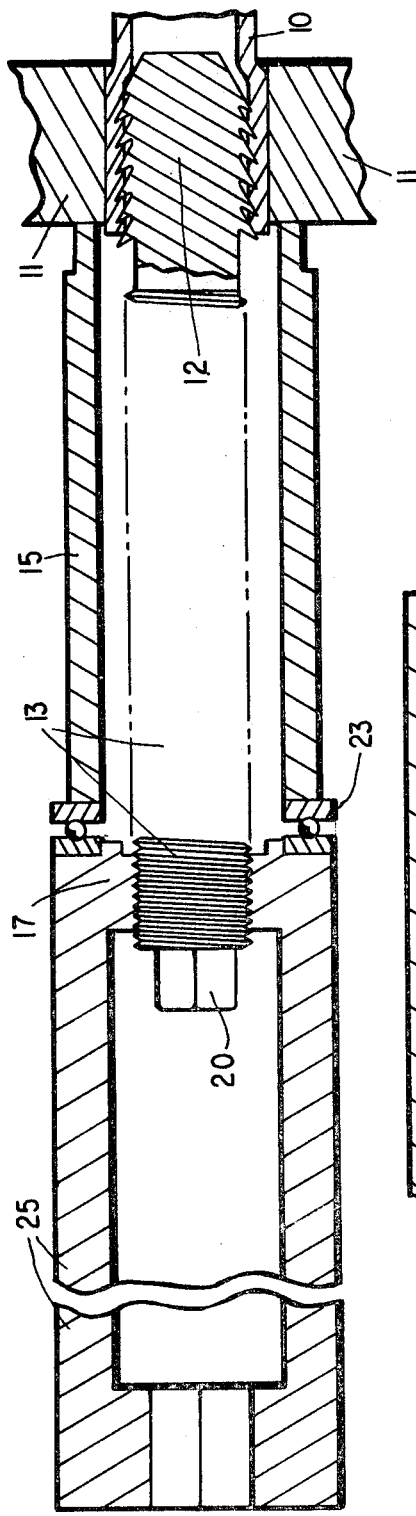
FIG. 1 is a lengthwise sectional view of a tap embodying my invention and including a structural arrangement for applying axial force to the tap.

Referring to FIG. 1 of the drawing, 10 designates the end portion of a tube expanded in the tube sheet 11.

The tap, threaded in the end of the tube, is formed with a threaded end portion 12 and an elongated shank portion 13.

In use, the threaded end portion 12 of the tap is threaded into the tube 10. A spacer sleeve 15 is positioned over the shank 13 and a nut 17 is threaded on the outer end of the shank 13. The outermost end 20 of the shank 13 is formed for the reception of a tool. For example, the end 20 may be of noncircular form to receive a wrench by which the tap is initially threaded into the tube. An anti-friction bearing 23 is interposed between the nut 17 and the spacer sleeve 15. It will be apparent that upon rotation of the nut 17, the tap is drawn outwardly from the tube sheet 11. In FIG. 1, the nut 17 is provided with a socket extension 25, adapted for connection to an impact wrench for rotation of the nut 17.

Figure 2:
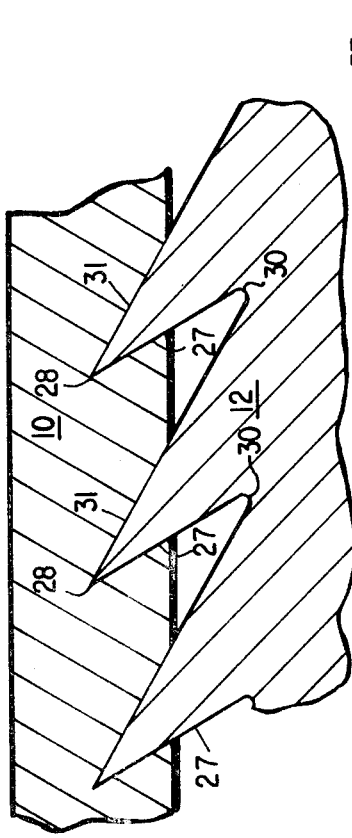
FIG. 2 is an enlarged sectional view of a portion of the tap threaded into the tube.
Figure 3:
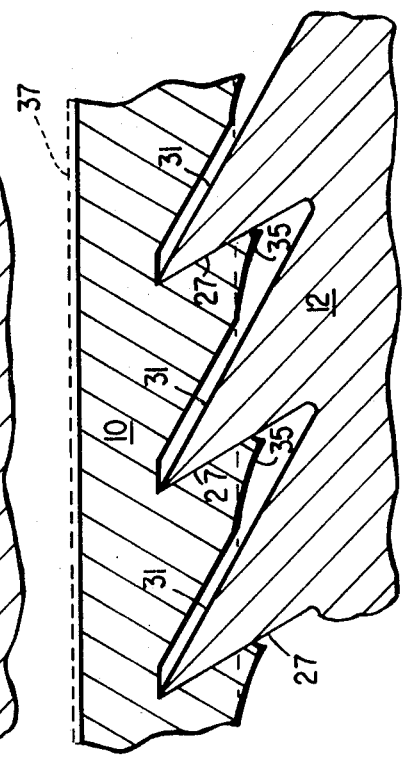
FIG. 3 is a view similar to FIG. 2 showing the tap moved axially relative to the tube by axial force applied to the tap.

Referring now to FIG. 2 the force applying sides 27 of the helixes of the tap incline from the crest 28 inwardly toward the root 30. This inclination is in a direction away from the shank and at an angle of between 25° and 45° to a plane normal to the axis of the tap. The opposite side 31 of the thread also extends from the crest 28 in a direction away from the shank and merges with the side 27 of the next adjacent thread on a radius at the root 30. The crest 28 is in the form of a sharp V angle. Because of the form of the tap thread, the tap when initially threaded into the tube does not expand the tube in the tube sheet as is the case with taps formed with conventional V or acme threads. On the other hand, the tap effects some contraction of the tube. When outward force is applied to the tap by rotation of the nut 17, the tap is first moved axially outwardly, relative to the tube, a short distance as indicated in FIG. 3. During this movement, the portion of the side wall engaged by the tap thread is separated from the body of the tube and is moved inwardly along the inclined side 27 of the tap, as indicated at 35, FIG. 3.

Due to the back angle of the side 27 of the thread, outward movement of the tap, relative to the fixed tube, does not result in the tube being expanded radially outwardly. On the contrary, the movement of the side wall material inwardly along the inclined side 27 of the tap results in the periphery of the tube being contracted or drawn inwardly to a greater extent, as indicated at 37, FIG. 3. This contraction of the tube is sufficient to materially reduce the frictional engagement of the tube with the tube sheet, with the result that the tube breaks loose from the sheet with the application of about 25 percent of the force necessitated with the use of a conventional tap.

I have found that the following dimensional arrangement of the tap functions particularly well for the extraction of copper tubes. The pitch of the thread is 1.8 to 2.5 times the thickness of the tube side wall. For example, a 10 pitch thread works exceptionally well on copper tubing three-quarters of an inch in diameter and having a side wall thickness of about .048 of an inch.

The diameter of the tap at the crest 28 is equal to the outer diameter of the tube less at least one-third of the thickness of the tube side wall, whereby the crest 28 of the threads penetrate the tube a distance sufficient to prevent the tap from pulling from the tube and on the other hand to prevent the tube from pulling apart. The diameter of the tap at the root 30 is equal to the inside diameter of the tube less about one-third the thickness of the tube side wall.

The tap formed and dimensioned as set forth above has been found in actual use to be particularly efficient and convenient and resulting in the application of much less force for the removal of the tubes from the tube sheets.

While I have described a preferred embodiment of my invention, it is to be understood the invention is not

I claim:

1. A tap for extracting tubes from tube sheets, said tap being formed with a shank and a threaded end portion for threaded engagement with a tube, said threaded end portion having a crest diameter equal to the outer tube diameter less at least one-third the thickness of the tube side wall and having a root diameter equal to the internal diameter of the tube less at least one-third the thickness of the tube side wall, the force applying side of the thread inclining from the crest of the thread toward the root thereof in a direction away from the shank at an angle of from 25° to 45°.

2. A tap as defined in claim 1 wherein the pitch of said thread is equal to 1.8 to 2.5 times the thickness of the tube side wall.

3. A tap as defined in claim 1 wherein the side of said thread, opposite to said force applying side, inclining from the crest of the thread in a direction from said shank and merging with the root of the next adjacent thread.

4. A tap as defined in claim 1 wherein the root diameter is equal to the internal diameter of the tube less one-half the thickness of the tube side wall.

5. A tap as defined in claim 1 wherein the crest diameter of said threaded portion is equal to the outer diameter of the tube less one-half the thickness of the tube side wall.

References Cited

UNITED STATES PATENTS

| | | | |
|---|---|---|---|
| 1,509,438 | 9/1924 | Miller | 10—145 |
| 1,873,250 | 8/1932 | Adolph | 29—281 X |
| 3,041,088 | 6/1962 | Brandon, Jr. | 85—46 X |
| 3,120,700 | 2/1964 | Chuplis, Jr. | 29—202 |

FOREIGN PATENTS

| | | | |
|---|---|---|---|
| 350,141 | 6/1931 | Great Britain | 85—46 |

JAMES M. MEISTER, Primary Examiner

U.S. Cl. X.R.

29—281